(12) United States Patent
Linkowski et al.

(10) Patent No.: US 12,282,333 B2
(45) Date of Patent: Apr. 22, 2025

(54) SYSTEMS AND METHODS FOR CALIBRATING A MAP OF AN AUTONOMOUS ROBOT

(71) Applicant: Ford Global Technologies, LLC, Dearborn, MI (US)

(72) Inventors: Gregory P. Linkowski, Dearborn, MI (US); Meghna Menon, Rochester Hills, MI (US); Shankar Narayan Mohan, Ann Arbor, MI (US); Ling Zhu, Canton, MI (US); Songan Zhang, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 17/711,482

(22) Filed: Apr. 1, 2022

(65) Prior Publication Data

US 2023/0315120 A1 Oct. 5, 2023

(51) Int. Cl.
*G05D 1/00* (2024.01)
*H04B 17/318* (2015.01)

(52) U.S. Cl.
CPC ......... *G05D 1/0274* (2013.01); *G05D 1/0212* (2013.01); *G05D 1/028* (2013.01); *H04B 17/318* (2015.01)

(58) Field of Classification Search
CPC .... G05D 1/0274; G05D 1/0212; G05D 1/028; G05D 2105/28; G05D 1/243; G05D 2107/70; G05D 2109/10; G05D 2111/34; G05D 1/246; G05D 1/247; H04B 17/318; B25J 9/1664; B25J 9/1694
See application file for complete search history.

(56) References Cited

U.S. PATENT DOCUMENTS

| 9,885,773 | B2 | 2/2018 | Hehn et al. |
| 10,217,169 | B2* | 2/2019 | Schumann, Jr. ............. G08G 1/096775 |
| 12,000,186 | B1* | 6/2024 | Mapson ............... E05D 15/101 |

(Continued)

FOREIGN PATENT DOCUMENTS

| CN | 107144852 | | 9/2017 | |
| CN | 113450414 | A * | 9/2021 | ........... G05D 1/0246 |
| EP | 2728516 | B1 * | 5/2017 | ........... G01S 13/876 |

OTHER PUBLICATIONS

Original and Translation to CN113450414B (Year: 2024).*

(Continued)

*Primary Examiner* — Frederick M Brushaber
(74) *Attorney, Agent, or Firm* — Burris Law, PLLC

(57) ABSTRACT

A method for calibrating a map of an autonomous robot, a trajectory of the autonomous robot, or a combination thereof includes obtaining localization data from a localization sensor of the autonomous robot and determining whether a calibration condition of the autonomous robot is satisfied based on the localization data. The method includes, in response to the calibration condition being satisfied: determining a master position coordinate of the autonomous robot based on a plurality of radio frequency (RF) signals broadcasted by a plurality of RF tags, converting the master position coordinate to a local position coordinate of the autonomous robot, and selectively updating the map, the trajectory, or a combination thereof based on the local position coordinate of the autonomous robot.

20 Claims, 5 Drawing Sheets

(56) References Cited

U.S. PATENT DOCUMENTS

| | | | | |
|---|---|---|---|---|
| 2005/0222751 A1* | 10/2005 | Uyeki | ............... | G08G 1/096827 340/995.13 |
| 2005/0222760 A1* | 10/2005 | Cabral | ............... | G01C 21/3492 340/995.13 |
| 2005/0222761 A1* | 10/2005 | Uyeki | ............... | G08G 1/096716 340/995.13 |
| 2005/0222763 A1* | 10/2005 | Uyeki | ............... | G01C 21/3492 340/995.13 |
| 2005/0222764 A1* | 10/2005 | Uyeki | ............... | G08G 1/096811 701/414 |
| 2005/0288856 A1* | 12/2005 | Uyeki | ............... | G01C 21/3415 701/423 |
| 2006/0071790 A1* | 4/2006 | Duron | ............... | G06K 17/00 340/572.1 |
| 2007/0290839 A1* | 12/2007 | Uyeki | ............... | G01C 21/3694 340/539.13 |
| 2011/0043373 A1* | 2/2011 | Best | ............... | G01S 1/68 340/8.1 |
| 2018/0232907 A1* | 8/2018 | Sung | ............... | H04N 17/002 |
| 2019/0212730 A1 | 7/2019 | Jones et al. | | |
| 2020/0103236 A1* | 4/2020 | Adams | ............... | G05D 1/0231 |
| 2020/0143561 A1* | 5/2020 | Hallett | ............... | G06T 7/13 |
| 2020/0292331 A1* | 9/2020 | Rabel | ............... | G06F 16/909 |
| 2022/0053295 A1* | 2/2022 | Ghourchian | ............... | G01S 13/765 |
| 2022/0194428 A1* | 6/2022 | Barabas | ............... | B60W 60/0025 |
| 2022/0281726 A1* | 9/2022 | Weichselgartner | ............... | G05D 1/646 |
| 2023/0202491 A1* | 6/2023 | Bergquist | ............... | G01S 13/876 701/1 |

OTHER PUBLICATIONS

Lentzas et al., From Robot Self-Localization to Global-Localization: An RSSI Based Approach, Dec. 20, 2021, 5 pages, available at URL: arXiv:2112.10578v1.

Shamsfakhr, et al., Robot Localisation Using UHF-RFID Tags: A Kalman Smoother Approach, Sensors, 2021, pp. 1-19, vol. 21, 717, MPDI, Switzerland.

* cited by examiner

SYSTEMS AND METHODS FOR CALIBRATING A MAP OF AN AUTONOMOUS ROBOT

FIELD

The present disclosure relates to systems and methods for calibrating a map of an autonomous robot.

BACKGROUND

The statements in this section merely provide background information related to the present disclosure and may not constitute prior art.

A manufacturing environment may include various autonomous robots that perform or assist with various manufacturing routines. The autonomous robots may autonomously travel along a defined path and perform known navigation routines based on a local map of the manufacturing environment to arrive at a given destination within the manufacturing environment and subsequently perform an automated task. The local maps of the autonomous robots may be uniquely defined according to the type of autonomous robot and the navigation hardware and/or navigation routines associated with the autonomous robots. Local maps of the autonomous robots may differ from human-readable maps of the manufacturing environment, thereby requiring the autonomous robot to convert global position coordinates received from a fleet management system to local position coordinates of the autonomous robot.

However, notwithstanding the conversion, the autonomous robots and/or operators may need to perform calibration routines to ensure that the autonomous robot accurately performs the navigation routines, such as updating local copies of the maps and performing an initial localization estimate prior to navigating within the manufacturing environment. For example, an operator may generate an initial localization estimate by an operator input and/or by instructing the autonomous robot to travel to a known location within the manufacturing environment. These issues with calibration routines in a manufacturing environment, among other issues, are addressed by the present disclosure.

SUMMARY

This section provides a general summary of the disclosure and is not a comprehensive disclosure of its full scope or all of its features.

The present disclosure provides a method for calibrating a map of an autonomous robot, a trajectory of the autonomous robot, or a combination thereof. The method includes obtaining localization data from a localization sensor of the autonomous robot and determining whether a calibration condition of the autonomous robot is satisfied based on the localization data. The method includes, in response to the calibration condition being satisfied: determining a master position coordinate of the autonomous robot based on a plurality of radio frequency (RF) signals broadcasted by a plurality of RF tags, converting the master position coordinate to a local position coordinate of the autonomous robot, and selectively updating the map, the trajectory, or a combination thereof based on the local position coordinate of the autonomous robot.

In one form, the method includes generating a predicted local position coordinate of the autonomous robot based on the localization data and determining a confidence score associated with the predicted local position coordinate, where determining whether the calibration condition of the autonomous robot is satisfied is further based on the confidence score. In one form, the calibration condition of the autonomous robot is satisfied when the confidence score is indicative a deviation condition associated with the detected object and a reference object of the local map being satisfied. In one form, the deviation condition is satisfied when the confidence score is indicative of a detected object at a plurality of local position coordinates of the map. In one form, selectively updating the map, the trajectory, or a combination thereof based on the local position coordinate of the autonomous robot further comprises updating the map based on the local position coordinate when the confidence score is less than a threshold value. In one form, selectively updating the map, the trajectory, or a combination thereof based on the local position coordinate of the autonomous robot further comprises updating the trajectory based on the local position coordinate when the confidence score is less than a threshold value.

In one form, the method includes determining whether the calibration condition of the autonomous robot is satisfied based on an operation state of the autonomous robot. In one form, the calibration condition of the autonomous robot is satisfied when the operation state of the autonomous robot is one of a power-up state and a connection restoration state. In one form, the method includes and/or the instructions include, in response to the calibration condition being satisfied: determining a plurality of received signal strength indicators (RSSIs) associated with each of the plurality of RF signals and determining a plurality of distances between the autonomous robot and the plurality of RF tags based on the plurality of RSSIs, where the master position coordinate of the autonomous robot is further based on the plurality of distances and a plurality of predefined master position coordinates associated with the plurality of RF tags. In one form, determining the plurality of RSSIs further comprises iteratively performing a Kalman filtering routine based on the plurality of RF signals. In one form, the method further includes determining a pose of the autonomous robot based on the local position coordinate, and where the localization data, the map, the trajectory, or a combination thereof are selectively updated based on the pose of the autonomous robot.

The present disclosure provides a system for calibrating a map of an autonomous robot, a trajectory of the autonomous robot, or a combination thereof. The system includes one or more processors and one or more nontransitory computer-readable mediums storing instructions that are executable by the one or more processors. The instructions include obtaining localization data from a localization sensor of the autonomous robot, generating a predicted local position coordinate of the autonomous robot based on the localization data, determining a confidence score associated with the predicted local position coordinate, and determining whether a calibration condition of the autonomous robot is satisfied based on the confidence score, an operation state of the autonomous robot, or a combination thereof. The instructions include, in response to the calibration condition being satisfied: determining a master position coordinate of the autonomous robot based on a plurality of radio frequency (RF) signals broadcasted by a plurality of RF tags, converting the master position coordinate to a local position coordinate of the autonomous robot, and selectively updating the map, the trajectory, or a combination thereof based on the local position coordinate of the autonomous robot.

The present disclosure provides a method for calibrating a map of an autonomous robot, a trajectory of the autonomous robot, or a combination thereof. The method includes obtaining localization data from a localization sensor of the autonomous robot, generating a predicted local position coordinate of the autonomous robot based on the localization data, determining a confidence score associated with the predicted local position coordinate, and determining whether a calibration condition of the autonomous robot is satisfied based on the confidence score, an operation state of the autonomous robot, or a combination thereof. The method includes, in response to the calibration condition being satisfied: determining a master position coordinate of the autonomous robot based on a plurality of radio frequency (RF) signals broadcasted by a plurality of RF tags, converting the master position coordinate to a local position coordinate of the autonomous robot, and selectively updating the map, the trajectory, or a combination thereof based on the local position coordinate of the autonomous robot.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
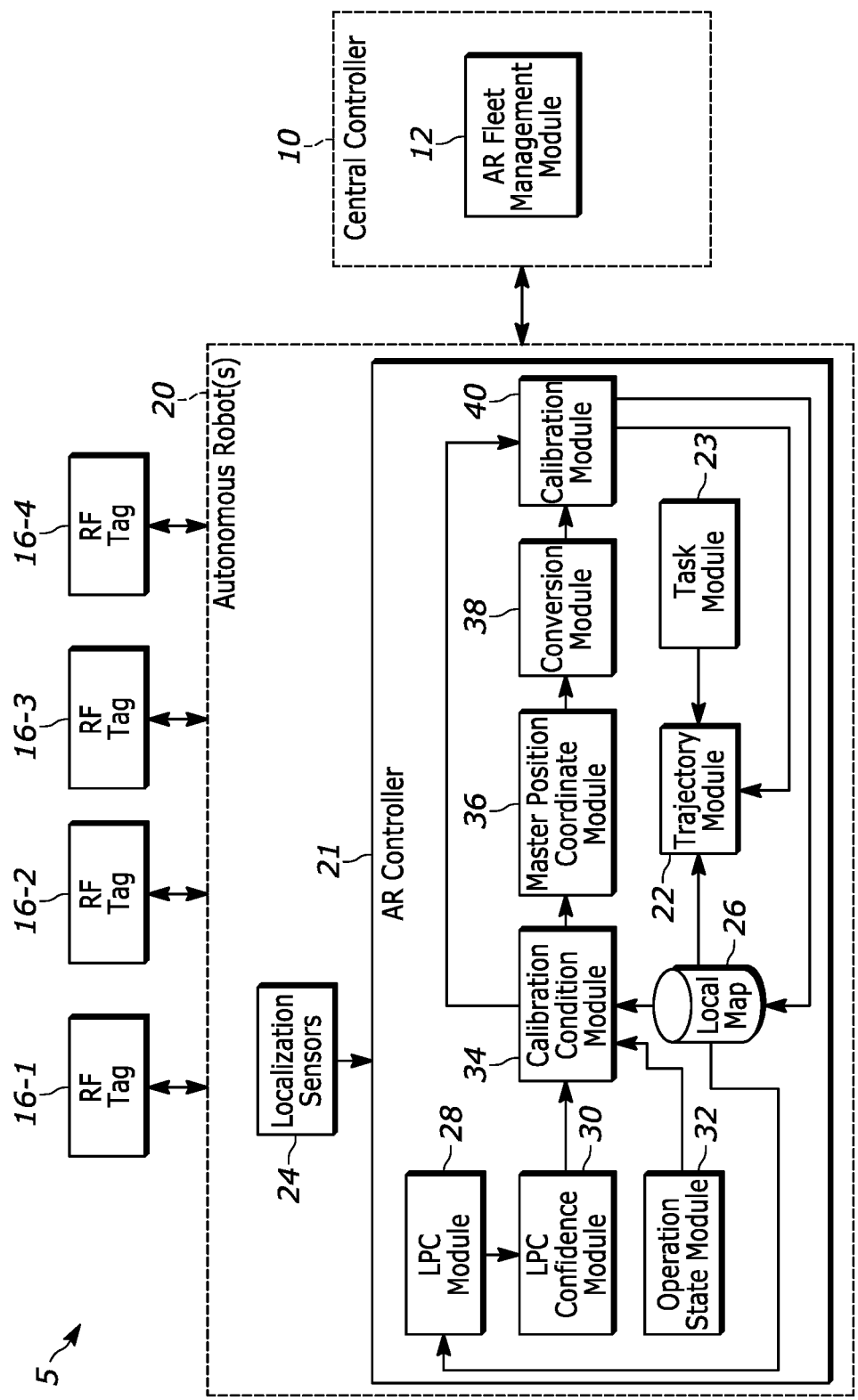
FIG. 1 is a functional block diagram of a manufacturing environment having one or more autonomous robots in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for calibrating a map and/or trajectory of an autonomous robot. An autonomous robot controller determines whether a calibration condition is satisfied based on localization data obtained from a localization sensor. The calibration condition may be satisfied when, for example, a confidence score associated with a predicted local coordinate determined based on the localization data and/or an operation state of the autonomous robot. When the calibration condition is satisfied, the autonomous controller determines a master position coordinate of the autonomous robot based on a plurality of radio frequency (RF) signals broadcasted by a plurality of RF tags, converts the master position coordinate to a local position coordinate of the autonomous robot, and selectively updates the map and/or the trajectory based on the local position coordinate. Accordingly, the autonomous robot controller automates the process for updating a local map of the autonomous robot and autonomously generates an initial localization estimate without operator input.

Referring to FIG. 1, a manufacturing environment 5 is provided and generally includes a central controller 10, a plurality of radio frequency identification (RFID) tags 16-1, 16-2, 16-3, 16-4 (collectively referred to hereinafter as "RF tags 16"), and one or more autonomous robots 20. It should be readily understood that any one of the modules/controllers of the central controller 10 and the one or more autonomous robots 20 can be provided at the same location or distributed at different locations (e.g., via one or more edge computing devices) and communicably coupled accordingly. In one form, the central controller 10, the RF tags 16, and the one or more autonomous robots 20 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the central controller 10 includes an autonomous robot (AR) fleet management module 12 that is configured to generate routes for the one or more autonomous robots 20 and instruct the one or more autonomous robots 20 to autonomously navigate within the manufacturing environment 5 based on the routes. As an example, the AR fleet management module 12 instructs the one or more autonomous robots 20 to autonomously navigate by transmitting the path to an autonomous robot (AR) controller 21 of the autonomous robot 20 and instructing the autonomous robot 20 to travel to the destination based on the path. As another example, the AR fleet management module 12 remotely and autonomously controls the one or more autonomous robots 20 as they travel to their respective destinations.

To control the autonomous movement of the one or more autonomous robots 20, the AR fleet management module 12 and/or the one or more autonomous robots 20 may employ known collision avoidance routines and autonomous navigation routines, such as a path planning routine, a maneuver planning routine, and/or a trajectory planning routine. As an example, the AR fleet management module 12 employs a reservation-based management system that reserves a defined path for the one or more autonomous robots 20 based on a continuous path planning routine, temporal information associated with the defined path, and priority information associated with the one or more autonomous robots 20. Example reservation management systems are described in U.S. patent application Ser. No. 17/559,268 titled "SYSTEMS AND METHODS FOR CONTROLLING AUTONOMOUS MOBILE ROBOTS IN A MANUFACTURING ENVIRONMENT," which is commonly owned with the present application and the contents of which are incorporated herein by reference in its entirety.

In one form, the RF tags 16 are configured to broadcast signals (e.g., a radio frequency (RF) signal, a Bluetooth low energy (BLE) signal, a radio frequency identification (RFID) signal, among other signals) to the autonomous robots 20 in response to receiving a localization request from the autonomous robot 20. As described below in further detail, the AR controller 21 is configured to generate a predicted local position coordinate based on the signals broadcasted by the RF tags 16. In one form, the RF tags 16 are disposed on various infrastructure elements of the manufacturing environment 5, such as an overhead beam, a tower, a light pole, a building, a sign, a machining device, a stationary storage rack/shelving system, among other infrastructure elements of the manufacturing environment 5.

In one form and as described below in further detail, the AR controller 21 generates a three-dimensional master position coordinate of the autonomous robots 20 using four RF tags 16. While four RF tags 16 are shown, it should be understood that any number of RF tags 16 may be provided within the manufacturing environment 5, such as two or three RF tags 16. As an example, the manufacturing environment 5 includes two or three RF tags 16 when the AR controller 21 generates a two-dimensional master position coordinate of the autonomous robot 20, as described below in further detail.

In one form, the one or more autonomous robots 20 are mobile robots or automated guided vehicles that are partially or fully autonomous and are configured to autonomously move to various locations of the manufacturing environment 5, as instructed by the central controller 10. To autonomously move itself, a trajectory module 22 of the AR controller 21 is configured to control various movement systems of the autonomous robot 20 (e.g., propulsion systems, steering systems, and/or brake systems) via actuators and based on one or more navigation sensors of the autonomous robot 20 (e.g., a global navigation satellite system (GNSS) sensor, an image sensor, a local position sensor, among others). Furthermore, the AR controller 21 is configured to operate the actuators to control the motion of one or more robotic links (e.g., robotic arms) attached thereto and thereby perform one or more automated tasks defined by a task module 23. The one or more automated tasks may refer to one or more motions the autonomous robot 20 performs to achieve a desired result (e.g., removing an unfinished workpiece from a bin, loading an unfinished or semi-finished workpiece into a fixture, transporting a payload from one location to another, among others).

To perform the functionality described herein, the central controller 10 and the one or more autonomous robots 20 may each include one or more processor circuits that are configured to execute machine-readable instructions stored in one or more nontransitory computer-readable mediums, such as a random-access memory (RAM) circuit and/or read-only memory (ROM) circuit. The one or more autonomous robots 20 may also include other components for performing the operations described herein, such as movement drivers and systems, transceivers, routers, and/or input/output interface hardware.

In one form, the autonomous robot 20 includes one or more localization sensors 24 configured to generate localization data associated with the autonomous robot 20. As used herein, "localization data" refers to data that is indicative of a location and/or an orientation of the autonomous robot 20 (collectively referred to hereinafter as "the pose of the autonomous robot 20"). As an example, the localization sensors 24 are provided by image sensors that obtain image data (as the localization data) of the manufacturing environment 5. Example image sensors may include, but are not limited to: a two-dimensional camera, a three-dimensional camera, an infrared sensor, a radar scanner, a laser scanner, among others. As described below in further detail, the AR controller 21 is configured to predict the location and/or orientation of the autonomous robot 20 based on the image data. It should be understood that the localization sensors 24 can be provided by any sensors that generate data indicative of the location and/or orientation of the autonomous robot 20 and is not limited to the examples described herein.

In one form, the AR controller 21 includes a local map 26, a local position coordinate (LPC) module 28, an LPC confidence module 30, an operation state module 32, a calibration condition module 34, a master position coordinate module 36, a conversion module 38, and a calibration module 40.

In one form, the LPC module 28 generates a predicted local position coordinate of the autonomous robot 20 based on the localization data obtained by the localization sensors 24. As an example, the LPC module 28 may perform known image processing routines (e.g., a difference-based image processing routine, a semantic-based image processing routine, among others) on the image data (as the localization data) to detect objects or contours thereof in the manufacturing environment 5. The LPC module 28 then correlates the detected objects/contours with reference objects/contours of the local map 26 to generate the predicted local position coordinate of the autonomous robot 20. In one form, the reference objects/contours of the local map 26 are generated during an initial calibration of the autonomous robot 20 and correspond to predicted objects/contours of the manufacturing environment 5 at various local position coordinates of the local map 26. In one form, the LPC module 28 additionally determines a predicted pose of the autonomous robot 20 in a similar manner.

In one form, the LPC confidence module 30 determines a confidence score associated with the predicted local position coordinate. The confidence score may be indicative of a likelihood that the predicted local position coordinate matches an actual local position coordinate of the autonomous robot 20. As an example, higher confidence scores may correspond to a higher likelihood that the predicted local position coordinate matches the actual local position coordinate, and lower confidence scores may correspond to a lower likelihood that the predicted local position coordinate matches the actual local position coordinate. In one form, the confidence score may be higher when the local position coordinate of the corresponding reference object/contour of the local map 26 is equal (or substantially equally) to the predicted local position coordinate.

In one form, the confidence score may be lower when a deviation condition associated with the detected object and reference object is satisfied. The deviation condition may be satisfied when the local position coordinate of the corresponding reference object/contour of the local map 26 is not equal (or not substantially equally) to the predicted local position coordinate (e.g., one of the detected objects has moved and a distance and/or orientation between the detected object and the reference object (or contours thereof) deviate beyond a threshold amount). The deviation condition may also be satisfied when the LPC confidence module 30 is unable to identify a corresponding reference object/contour of the local map 26 associated with the detected objects (e.g., the detected objects have been introduced into the given area of the manufacturing environment 5 from an external location). The deviation condition may also be satisfied when the LPC module 28 detects the objects (or contours thereof) at a plurality of locations of the manufacturing environment 5.

Figure 2:
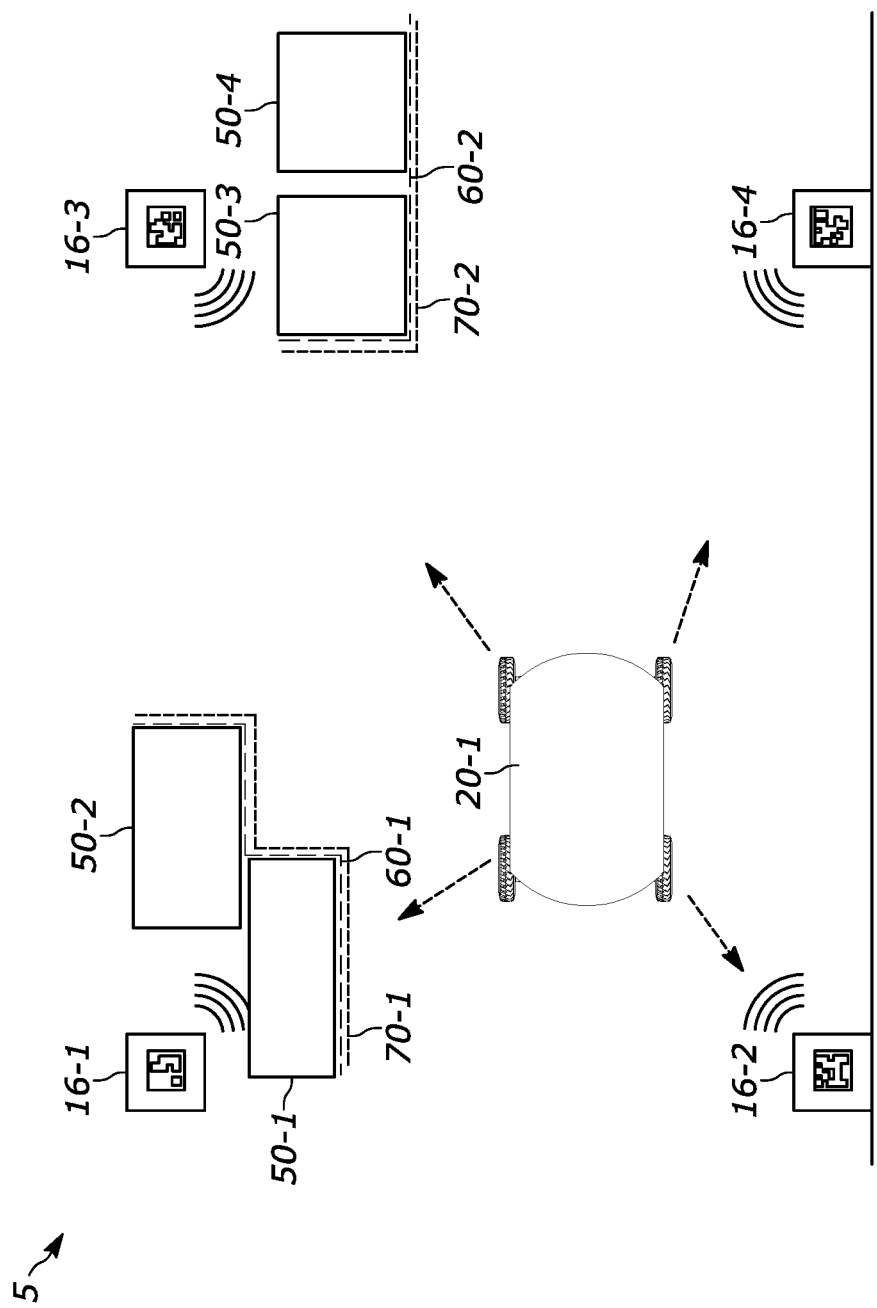
FIG. 2 illustrates a localization routine performed by an autonomous robot in accordance with the teachings of the present disclosure.

As an example and referring to FIGS. 1-2, the LPC module 28 detects objects 50-1, 50-2, 50-3, 50-4 (collectively referred to hereinafter as "detected objects 50"), a first contour 60-1 associated with the detected objects 50-1, 50-2, and a second contour 60-2 associated with the detected objects 50-3, 50-4. Subsequently, the LPC module 28 generates the predicted local position coordinate of the autonomous robot 20-1 by identifying the local position coordinates of reference contour 70-1 and reference contour 70-2 of the local map 26 associated with the first contour 60-1 and the second contour 60-2, respectively. The LPC confidence module 30 then determines that the confidence score associated with the predicted local position coordinates are higher (and thus the deviation condition is not satisfied) due to the local position coordinates of the reference contour 70-1 being substantially equal to the predicted local position coordinates of the first contour 60-1 and the local position coordinates of the reference contour 70-2 being substantially equal to the predicted local position coordinates of the second contour 60-2.

Figure 3:
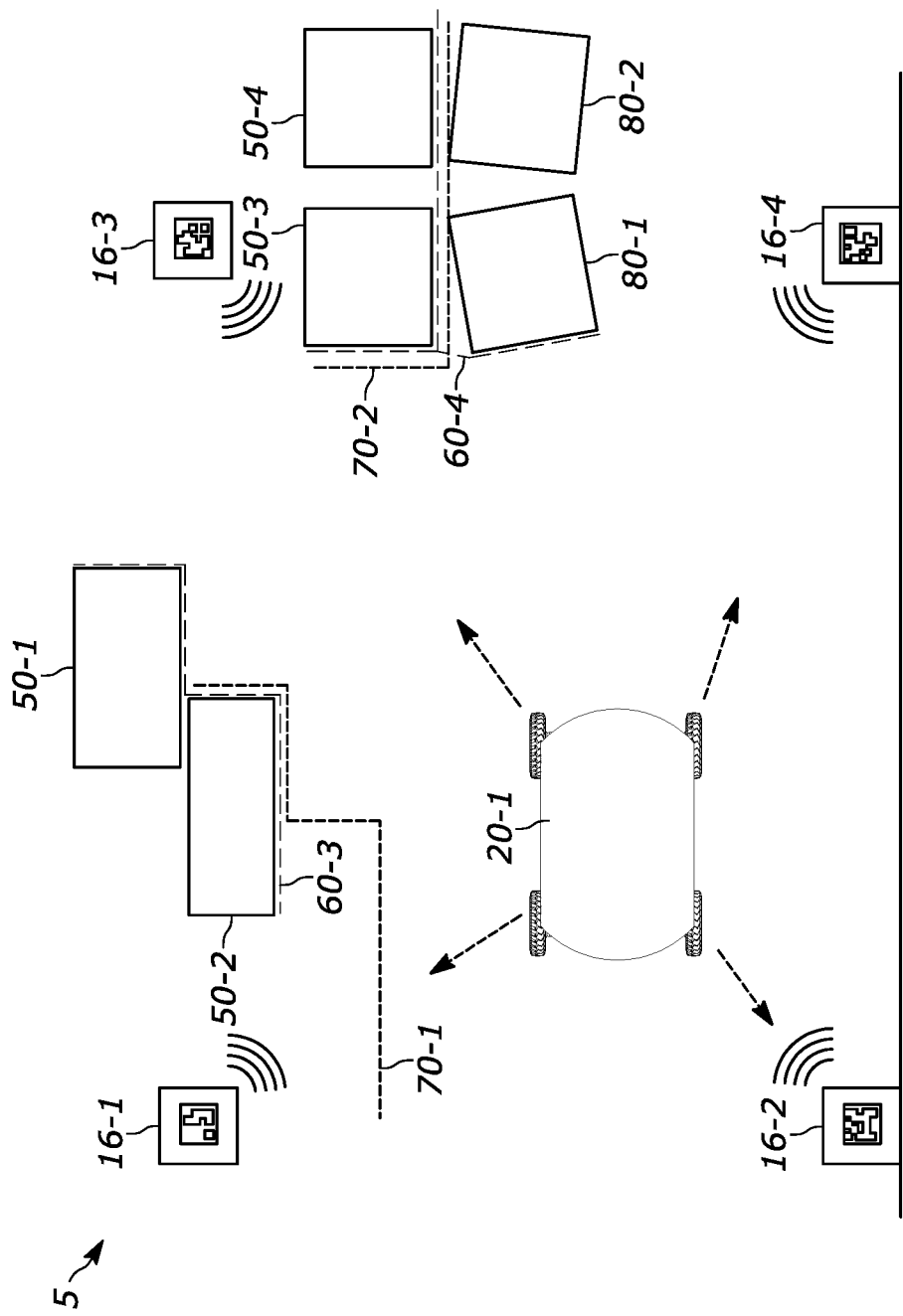
FIG. 3 illustrates another localization routine performed by an autonomous robot in accordance with the teachings of the present disclosure.

As another example and referring to FIGS. 1 and 3, the LPC module 28 detects the objects 50, a third contour 60-3 associated with the detected objects 50-1, 50-2, and a fourth contour 60-4 associated with the detected objects 50-3, 50-4. Subsequently, the LPC module 28 generates the predicted local position coordinate of the autonomous robot 20-1 by identifying the local position coordinates of the reference contours 70-1, 70-2. The LPC confidence module 30 then determines that the confidence score associated with the predicted local position coordinates of the contour 60-3 are lower (and thus the deviation condition is satisfied) due to the movement of detected objects 50-1, 50-2 relative to the reference contour 70-1. The LPC confidence module 30 also determines that the confidence score associated with the predicted local position coordinates of the fourth contour 60-4 are lower (and thus the deviation condition is satisfied) due to the introduction of additional objects 80-1, 80-2 and the resulting shape change of the fourth contour 60-4 relative to the reference contour 70-2.

In one form and referring to FIG. 1, the operation state module 32 determines an operation state of the autonomous robot 20. In one form, the operation state includes a power-up state, a connection restoration state, and a normal state. As used herein, "power-up state" refers to a predefined period of time after the autonomous robot 20 is turned on by an operator in response to, for example, a maintenance routine performed by an operator on the autonomous robot 20. As used herein, "connection restoration state" refers to a predefined period of time after the autonomous robot 20 restores its communication link with the central controller 10 after the communication link is decoupled. As used herein, "normal state" refers to a state in which the autonomous robot 20 is not in the power-up state or the connection restoration state. In one form, the operation state module 32 is configured to monitor the data communicated between the central controller 10 and the AR controller 21 and/or perform known power disruption detection routines.

In one form, the calibration condition module 34 is configured to determine whether a calibration condition of the autonomous robot 20 is satisfied based on at least one of the localization data, the confidence score, and the operation state. As an example, the calibration condition may be satisfied when the operation state of the of autonomous robot 20 is in one of the power-up state and the connection restoration state. As another example, the calibration condition may be satisfied when the confidence score is below a threshold value and, as such, the deviation condition is satisfied.

In one form, the master position coordinate module 36 determines a master position coordinate of the autonomous robot 20 (e.g., a GNSS coordinate, an indoor positioning system coordinate, among other master position coordinate systems) based on the RF signals broadcasted by the RF tags 16 in response to the calibration condition being satisfied. To perform the functionality described herein, it should be understood that the master position coordinate module 36 may include transceivers, routers, and/or input/output interface hardware for communicating with the RF tags 16.

As an example, the master position coordinate module 36 broadcasts a ping request to the RF tags 16, and in response to receiving the ping request, the RF tags 16 broadcast an RF signal to the master position coordinate module 36. In one form, the RF signals include information identifying the respective RF tags 16 and a predefined master position coordinate associated with the respective RF tags 16.

The master position coordinate module 36 then determines a received signal strength indicator (RSSI) associated with each of the RF signals broadcasted by the RF tags 16. As an example, the master position coordinate module 36 iteratively performs a Kalman filtering routine based on the plurality of RF signals to determine the RSSI associated with each of the RF signals, thereby inhibiting signal noise and RSSI inaccuracies caused by multi-path reflections and other physical and/or communication obstructions of the manufacturing environment 5.

The master position coordinate module 36 then determines a plurality of distances between the autonomous robot 20 and the RF tags 16 based on the plurality of RSSIs using known RSSI-to-distance calculation routines. Subsequently, the master position coordinate module 36 determines the master position coordinate of the autonomous robot 20 based on the plurality of distances and the predefined master position coordinates associated with the RF tags 16. As an example, when the master position coordinates are GNSS coordinates, the master position coordinate module 36 determines the GNSS coordinate of the autonomous robot 20 by performing a pseudo-range multilateration routine that is based on the predefined GNSS position coordinates of the RF tags 16 and the plurality of distances.

In one form, the conversion module 38 converts the master position coordinate generated by the master position coordinate module 36 to a local position coordinate that can be processed and interpreted by AR controller 21 in response to the calibration condition being satisfied. As an example, the conversion module 38 performs master-to-local position coordinate conversion routines and transformation matrices that are uniquely defined for the autonomous robot 20 to convert the master position coordinate to the local position coordinate.

In one form, the calibration module 40 selectively updates the local map 26 and/or the trajectory defined by the trajectory module 22 based on the local position coordinate generated by the conversion module 38 and in response to the calibration condition being satisfied. In one form, the calibration module 40 refrains from updating the local map 26 and the trajectory defined by the trajectory module 22 when the calibration condition is not satisfied.

As an example and in response to the calibration condition being satisfied (i.e., the confidence score is less than a threshold value and thus satisfies the deviation condition, the operation state is one of the power-up and connection restoration states, or a combination thereof), the calibration module 40 updates the local map 26 based on the localization data (e.g., the detected objects 50, the additional detected objects 80-1, 80-2, and/or the contours 60-1, 60-2, 60-3, 60-4) and the local position coordinate determined by the conversion module 38. More specifically, the calibration module 40 utilizes the obtained localization data and the local position coordinate to redefine the reference objects and contours of the local map 26.

As another example and in response to the calibration condition being satisfied, the calibration module 40 updates the trajectory defined by the trajectory module 22 based on the localization data (e.g., the detected objects 50, the additional detected objects 80-1, 80-2, and/or the contours 60-1, 60-2, 60-3, 60-4) and the local position coordinate determined by the conversion module 38. More specifically, the calibration module 40 utilizes the obtained localization data and the local position coordinate to adjust its trajectory and thereby accommodate and/or avoid, for example, the detected objects 50 and/or the additional detected objects 80-1, 80-2.

Figure 4:
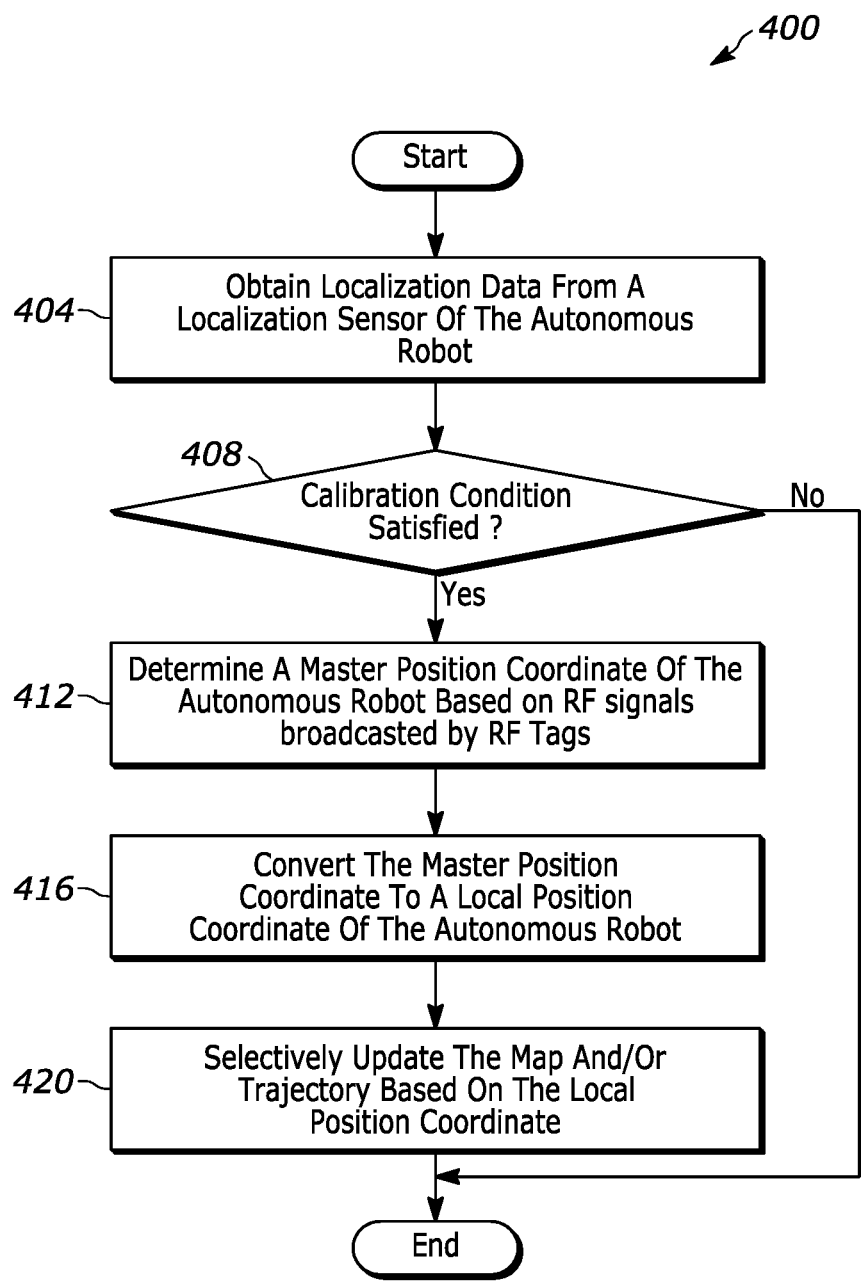
FIG. 4 is a flowchart of an example control routine in accordance with the teachings of the present disclosure.

Referring to FIG. 4, a flowchart illustrating a routine 400 for calibrating the local map 26 and/or the trajectory of the autonomous robot 20 is shown. At 404, the AR controller 21 obtains localization data from the localization sensors 24. At 408, the AR controller 21 determines whether the calibration condition of the autonomous robot 20 is satisfied based on the localization data. If so, the routine 400 proceeds to 412. Otherwise, if the calibration condition is not satisfied at 408, the routine 400 ends. At 412, the AR controller 21 determines a master position coordinate of the autonomous robot 20 based on the RF signals broadcasted by the RF tags 16. At 416, the AR controller 21 converts the master position coordinate to a local position coordinate of the autonomous robot 20. At 420, the AR controller 21 selectively updates the local map 26 and/or the trajectory based on the local position coordinate of the autonomous robot 20.

Figure 5:
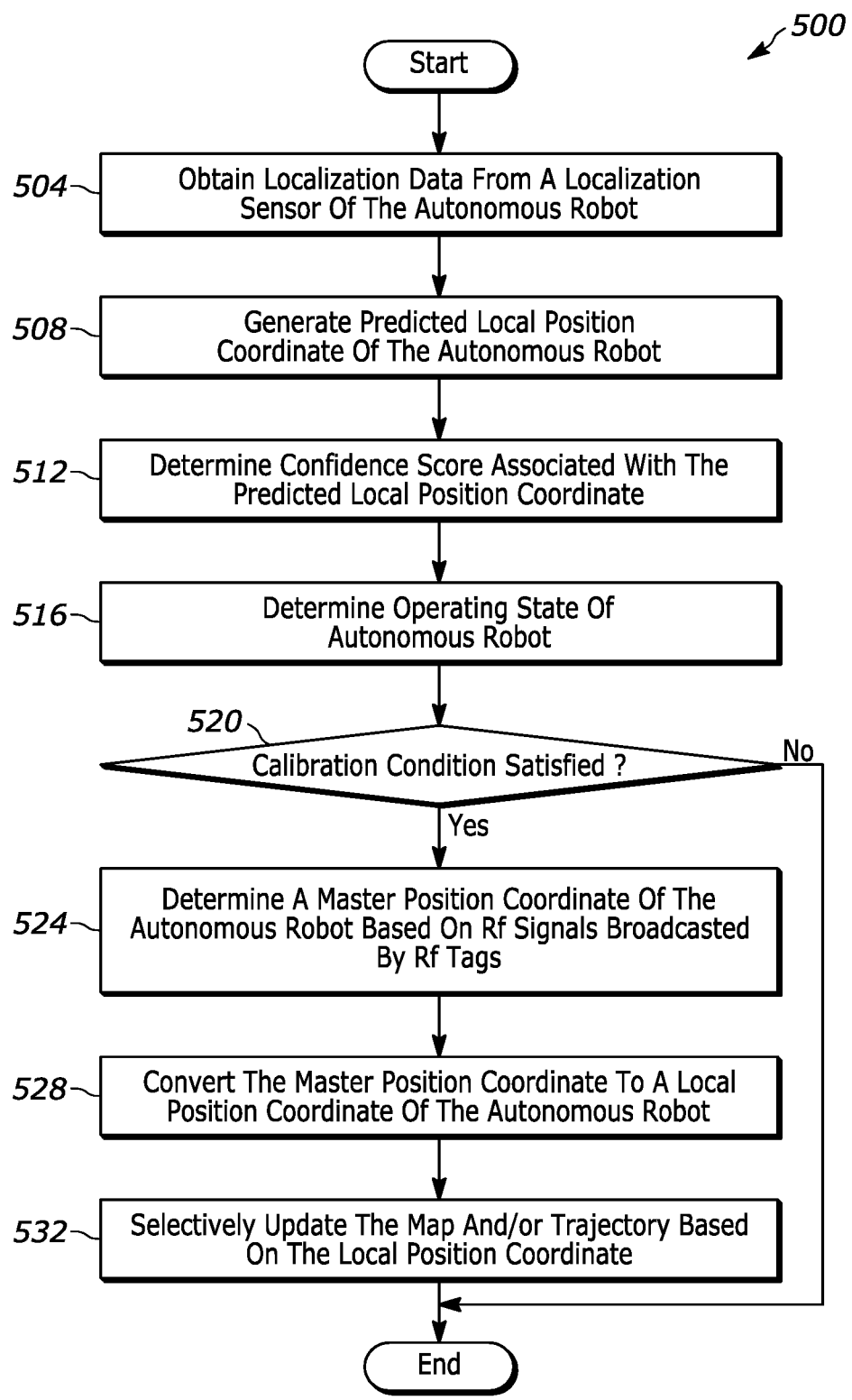
FIG. 5 is a flowchart of another example control routine in accordance with the teachings of the present disclosure.

Referring to FIG. 5, a flowchart illustrating a routine 500 for calibrating the local map 26 and/or the trajectory of the autonomous robot 20 is shown. At 504, the AR controller 21 obtains localization data from the localization sensors 24. At 508, the AR controller 21 generates a predicted local position coordinate of the autonomous robot 20. At 512, the AR controller 21 determines a confidence score associated with the predicted local position coordinate. At 516, the AR controller 21 determines an operating state of the autonomous robot 20. At 520, the AR controller 21 determines whether the calibration condition of the autonomous robot 20 is satisfied based on the confidence score and/or the operation state. If the calibration condition is satisfied, the routine 500 proceeds to 524. Otherwise, if the calibration condition is not satisfied at 520, the routine 500 ends. At 524, the AR controller 21 determines a master position coordinate of the autonomous robot 20 based on the RF signals broadcasted by the RF tags 16. At 528, the AR controller 21 converts the master position coordinate to a local position coordinate of the autonomous robot 20. At 532, the AR controller 21 selectively updates the local map 26 and/or the trajectory based on the local position coordinate of the autonomous robot 20.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer. The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for calibrating a map of an autonomous robot, a trajectory of the autonomous robot, or a combination thereof, the method comprising:
    obtaining localization data from a localization sensor of the autonomous robot;
    determining whether a calibration condition of the autonomous robot is satisfied based on the localization data; and
    in response to the calibration condition being satisfied:
        determining a master position coordinate of the autonomous robot based on a plurality of radio frequency (RF) signals broadcasted by a plurality of RF tags;
        converting the master position coordinate to a local position coordinate of the autonomous robot;
        selectively updating the map based on the local position coordinate of the autonomous robot; and
        adjusting the trajectory of the autonomous robot based on the updated map.

2. The method of claim 1 further comprising:
    generating a predicted local position coordinate of the autonomous robot based on the localization data; and
    determining a confidence score associated with the predicted local position coordinate, wherein determining whether the calibration condition of the autonomous robot is satisfied is further based on the confidence score.

3. The method of claim 2, wherein the calibration condition of the autonomous robot is satisfied when the confidence score is indicative a deviation condition associated with a detected object and a reference object of the local map being satisfied.

4. The method of claim 3, wherein the deviation condition is satisfied when the confidence score is indicative of the detected object at a plurality of local position coordinates of the map.

5. The method of claim 2, wherein selectively updating the map, the trajectory, or a combination thereof based on the local position coordinate of the autonomous robot further comprises:
updating the map based on the local position coordinate when the confidence score is less than a threshold value.

6. The method of claim 2, wherein selectively updating the map, the trajectory, or a combination thereof based on the local position coordinate of the autonomous robot further comprises:
updating the trajectory based on the local position coordinate when the confidence score is less than a threshold value.

7. The method of claim 1 further comprising determining whether the calibration condition of the autonomous robot is satisfied based on an operation state of the autonomous robot.

8. The method of claim 7, wherein the calibration condition of the autonomous robot is satisfied when the operation state of the autonomous robot is one of a power-up state and a connection restoration state.

9. The method of claim 1 further comprising, in response to the calibration condition being satisfied:
determining a plurality of received signal strength indicators (RSSIs) associated with each of the plurality of RF signals; and
determining a plurality of distances between the autonomous robot and the plurality of RF tags based on the plurality of RSSIs, wherein the master position coordinate of the autonomous robot is further based on the plurality of distances and a plurality of predefined master position coordinates associated with the plurality of RF tags.

10. The method of claim 9, wherein determining the plurality of RSSIs further comprises iteratively performing a Kalman filtering routine based on the plurality of RF signals.

11. The method of claim 1 further comprising determining a pose of the autonomous robot based on the local position coordinate, and wherein the localization data, the map, the trajectory, or a combination thereof are selectively updated based on the pose of the autonomous robot.

12. A system for calibrating a map of an autonomous robot, a trajectory of the autonomous robot, or a combination thereof, the system comprising:
one or more processors and one or more non-transitory computer-readable mediums storing instructions that are executable by the one or more processors, wherein the instructions comprise:
obtaining localization data from a localization sensor of the autonomous robot;
generating a predicted local position coordinate of the autonomous robot based on the localization data;
determining a confidence score associated with the predicted local position coordinate;
determining whether a calibration condition of the autonomous robot is satisfied based on at least one of the confidence score and an operation state of the autonomous robot; and
in response to the calibration condition being satisfied:
determining a master position coordinate of the autonomous robot based on a plurality of radio frequency (RF) signals broadcasted by a plurality of RF tags;
converting the master position coordinate to a local position coordinate of the autonomous robot;
selectively updating the map based on the local position coordinate of the autonomous robot; and
adjusting the trajectory of the autonomous robot based on the updated map.

13. The system of claim 12, wherein the calibration condition of the autonomous robot is satisfied when the confidence score is indicative a deviation condition associated with a detected object and a reference object of the local map being satisfied.

14. The system of claim 13, wherein the deviation condition is satisfied when the confidence score is indicative of the detected object at a plurality of local position coordinates of the map.

15. The system of claim 12, wherein the calibration condition of the autonomous robot is satisfied when the operation state of the autonomous robot is one of a power-up state and a connection restoration state.

16. The system of claim 12, wherein the instructions further comprise, in response to the calibration condition being satisfied:
determining a plurality of received signal strength indicators (RSSIs) associated with each of the plurality of RF signals; and
determining a plurality of distances between the autonomous robot and the plurality of RF tags based on the plurality of RSSIs, wherein the master position coordinate of the autonomous robot is further based on the plurality of distances and a plurality of predefined master position coordinates associated with the plurality of RF tags.

17. The system of claim 16, wherein the instructions for determining the plurality of RSSIs further comprises iteratively performing a Kalman filtering routine based on the plurality of RF signals.

18. A method for calibrating a map of an autonomous robot, a trajectory of the autonomous robot, or a combination thereof, the method comprising:
obtaining localization data from a localization sensor of the autonomous robot;
generating a predicted local position coordinate of the autonomous robot based on the localization data;
determining a confidence score associated with the predicted local position coordinate;
determining whether a calibration condition of the autonomous robot is satisfied based on at least one of the confidence score and an operation state of the autonomous robot; and
in response to the calibration condition being satisfied:
determining a master position coordinate of the autonomous robot based on a plurality of radio frequency (RF) signals broadcasted by a plurality of RF tags;
converting the master position coordinate to a local position coordinate of the autonomous robot;
selectively updating the map based on the local position coordinate of the autonomous robot; and
adjusting the trajectory of the autonomous robot based on the updated map.

19. The method of claim 18, wherein selectively updating the map, the trajectory, or a combination thereof based on the local position coordinate of the autonomous robot further comprises updating the map and the trajectory based on the local position coordinate when the confidence score is less than a threshold value.

20. The method of claim 18, wherein the calibration condition of the autonomous robot is satisfied when the autonomous robot is in one of a power-up state and a connection restoration state.

* * * * *